US011321563B2

(12) United States Patent
Cypriano et al.

(10) Patent No.: US 11,321,563 B2
(45) Date of Patent: May 3, 2022

(54) HANDLING OF ARAIM TERRAIN DATABASE INDUCED ERRORS

(71) Applicant: Honeywell Aerospace SAS, Toulouse (FR)

(72) Inventors: Lucas Almeida Cypriano, Brno (CZ); Michal Zaruba, Kromeriz (CZ); Matej Kucera, Dysina-Nova Hut (CZ); Martin Orejas, Brno (CZ)

(73) Assignee: Honeywell Aerospace SAS, Toulouse (FR)

( * ) Notice: Subject to any disclaimer, the term of this patent is extended or adjusted under 35 U.S.C. 154(b) by 442 days.

(21) Appl. No.: 16/554,458

(22) Filed: Aug. 28, 2019

(65) Prior Publication Data

US 2021/0064847 A1    Mar. 4, 2021

(51) Int. Cl.
| | |
|---|---|
| *G06K 9/00* | (2022.01) |
| *G06F 16/29* | (2019.01) |
| *G01S 19/41* | (2010.01) |
| *G06F 17/18* | (2006.01) |

(52) U.S. Cl.
CPC ............ *G06K 9/0063* (2013.01); *G01S 19/41* (2013.01); *G06F 16/29* (2019.01); *G06F 17/18* (2013.01)

(58) Field of Classification Search
CPC .......... G01S 19/20; G01S 19/41; G06F 16/29; G06F 17/18; G06K 9/0063
See application file for complete search history.

(56) References Cited

U.S. PATENT DOCUMENTS

| | | | |
|---|---|---|---|
| 6,205,377 B1 | 3/2001 | Lupash et al. | |
| 6,281,836 B1 | 8/2001 | Lupash et al. | |
| 7,145,501 B1* | 12/2006 | Manfred | G01C 5/005 |
| | | | 342/120 |
| 8,798,819 B2 | 8/2014 | Murphy | |
| 10,197,678 B1* | 2/2019 | Wang | G01S 19/20 |

(Continued)

FOREIGN PATENT DOCUMENTS

EP    1466139 B1    2/2011

OTHER PUBLICATIONS

Blanch et al., "Advanced RAIM User Algorithm Description: Integrity Support Message Processing, Fault Detection, Exclusion, and Protection Level Calculation", Proceedings of the 25th International Technical Meeting of the Satellite Division of The Institute of Navigation, 2012, pp. 1-23.

(Continued)

*Primary Examiner* — Avinash Yentrapati
(74) *Attorney, Agent, or Firm* — Fogg & Powers LLC

(57) ABSTRACT

Systems and methods for handling ARAIM terrain database induced errors are described herein. In certain embodiments, a method includes computing position information from a global navigation satellite system. The method further includes computing altitude based on retrieved information from a vertical position sensor and a terrain database. Additionally, the method includes computing a horizontal protection level associated with the position information. Also, the method includes estimating an error for a terrain database based on the altitude, position information, and the horizontal protection level. Moreover, the method includes calculating a new protection level based on the position information and the altitude accounting for the estimated error for the terrain database.

20 Claims, 6 Drawing Sheets

(56) References Cited

U.S. PATENT DOCUMENTS

| | | | | |
|---|---|---|---|---|
| 10,466,362 | B1* | 11/2019 | Wang | G01S 19/20 |
| 2014/0292574 | A1* | 10/2014 | Dunik | G01S 19/20 |
| | | | | 342/357.58 |
| 2017/0350973 | A1 | 12/2017 | Dunik et al. | |
| 2018/0259648 | A1* | 9/2018 | Skalicky | G01S 19/20 |
| 2018/0283871 | A1 | 10/2018 | Kana et al. | |
| 2020/0326428 | A1* | 10/2020 | Kana | G01S 19/23 |

OTHER PUBLICATIONS

Felux et al. "Analysis of a GNSS/Radar Altimeter integration for improved touch-down performance in automatic landings", GNSS Vulnerabilities & Solutions Conference, Jan. 2011, pp. 1-8.

ICAO, "Aeronautical Information Services—Annex 15 to the Convention on International Civil Aviation", International Standards and Recommended Practices, Fifteenth Edition, Jul. 2016, pp. 1-152, ICAO.

Li et al. "High accuracy tightly-coupled integrity monitoring algorithm for map-matching", Transportation Research Part C 36 (2013) 13-26, www.elsevier.com/locate/trc, Received May 31, 2012, pp. 1-14.

Braff, "Integrated GNSS/Altimeter Landing System", ION GNSS 20th International Technical Meeting of the Satellite Division, Sep. 2007, pp. 2934 through 2949, Fort Worth, TX.

European Patent Office, "Extended European Search Report from EP Application No. 20181775.6", from Foreign Counterpart to U.S. Appl. No. 16/554,458, dated Nov. 27, 2020, pp. 1 through 10, Published: EP.

\* cited by examiner

HANDLING OF ARAIM TERRAIN DATABASE INDUCED ERRORS

STATEMENT REGARDING FEDERALLY SPONSORED RESEARCH OR DEVELOPMENT

The project leading to this application has received funding from the SESAR Joint Undertaking under grant agreement No 731781 under European Union's Horizon 2020 research and innovation programme.

BACKGROUND

Global navigation satellite systems (GNSS) have become a ubiquitous navigation technology. However, GNSS technology is not without its limitations and constraints. One particular constraint of GNSS is that GNSS does not have, by itself, sufficient assured integrity to be used in some stringent operations. For example, GNSS does not have sufficient assured integrity to support aircraft during landing procedures. As GNSS does not have sufficient integrity for certain operations, the measurements provided by the GNSS may be merged with measurements from other sensors to improve the performance of an associated navigational system. One such combination, implemented an aircraft, is the use of a radar altimeter and a terrain database in combination with the GNSS measurements. The combination of GNSS receiver and a radar altimeter may significantly improve the performance of an associated navigation system.

SUMMARY

Systems and methods for handling ARAIM terrain database induced errors are described herein. In certain embodiments, a method includes computing position information from a global navigation satellite system. The method further includes computing altitude based on retrieved information from a vertical position sensor and a terrain database. Additionally, the method includes computing a horizontal protection level associated with the position information. Also, the method includes estimating an error for a terrain database based on the altitude, position information, and the horizontal protection level. Moreover, the method includes calculating a new protection level based on the position information and the altitude accounting for the estimated error for the terrain database.

DRAWINGS

Understanding that the drawings depict only some embodiments and are not therefore to be considered limiting in scope, the exemplary embodiments will be described with additional specificity and detail using the accompanying drawings, in which.

Figure 4:
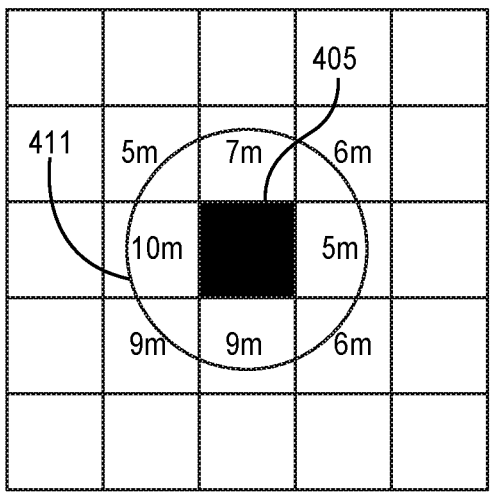
Figure 4:
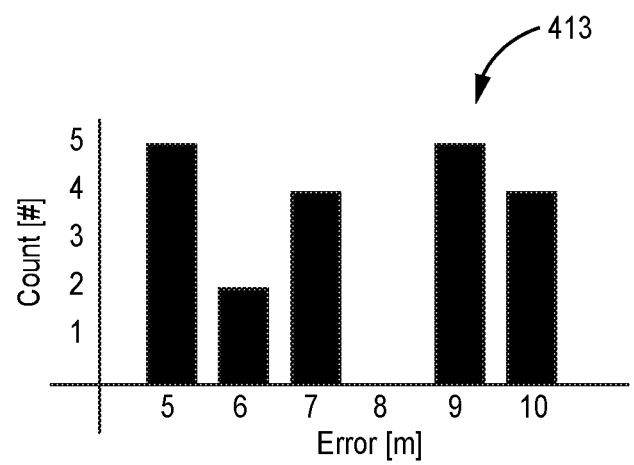
Figure 5:
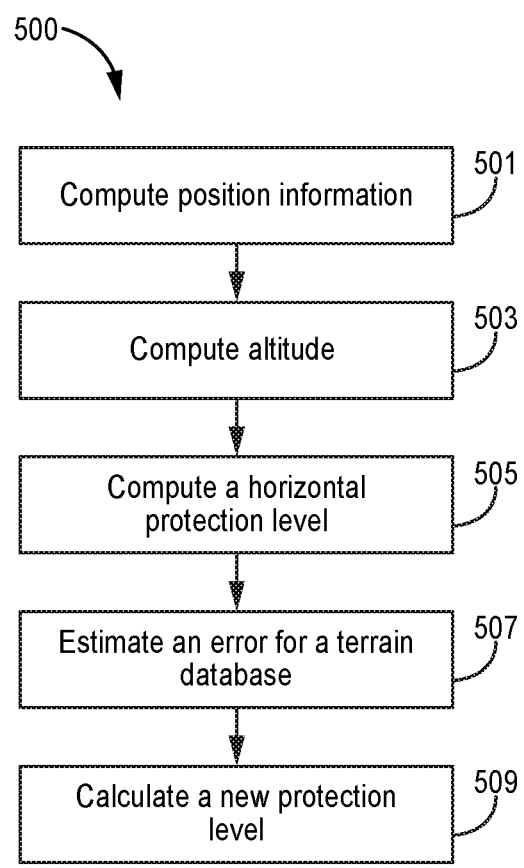

FIG. 4 is a series of diagrams illustrating the applications of weights to error samples associated with a horizontal protection level bound area according to an aspect of the present disclosure; and FIG. 5 is a flowchart diagram illustrating a method for handling Advanced Receiver Autonomous Integrity Monitor (ARAIM) terrain database induced errors according to an aspect of the present disclosure.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

In certain embodiments, a GNSS based navigation system may be augmented with a radar altimeter. While improving the accuracy of navigational measurements, augmenting the GNSS based navigation system with a radar altimeter, or other vertical position sensor, may connect horizontal errors to vertical errors. To account for the connected horizontal and vertical errors, the navigation system may select points within a terrain database based on a horizontal protection level for the horizontal position of the navigation system. Using the selected points, the navigation system may be able to compute the set of possible vertical errors due to differences between an estimated position and an actual position of the system.

Figure 1:
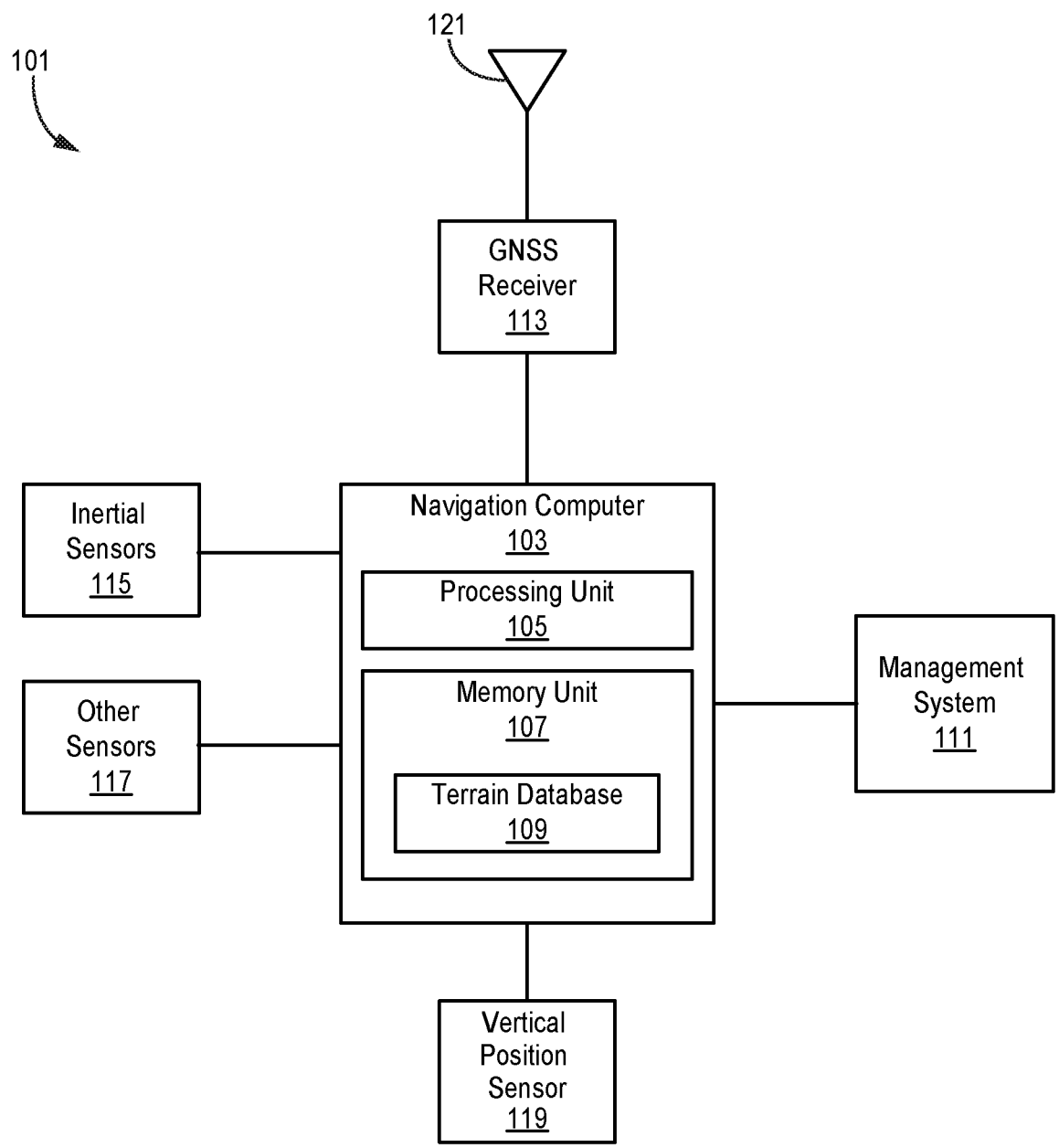
FIG. 1 is a block diagram illustrating an exemplary navigation system according to an aspect of the present disclosure.

FIG. 1 is a block diagram of a navigation system 101 that is capable of handling advanced receiver autonomous integrity monitor (ARAIM) terrain database induced errors. The navigation system 101 may be mounted to a mobile object, such as an aircraft, sea craft, spacecraft, automobile, other type of vehicle, or other object that is capable of motion. Additionally, the navigation system 101 may acquire navigation information from one or more different sources. To handle the acquired navigation information, the navigation system 101 may include a navigation computer 103. The navigation computer 103 may further include at least one processing unit 105 and at least one memory unit 107.

In certain embodiments, the navigation system 101 may acquire navigation information that includes inertial motion information and GNSS measurements. To acquire the inertial motion information, the navigation system 101 may include inertial sensors 115 that measure and sense the inertial motion of the object containing the navigation system 101. To acquire the GNSS measurements, the navigation system 101 may include a GNSS receiver 113 with at least one antenna 121 that receives satellite signals from multiple GNSS satellites. Further, in some implementations, the navigation system 101 may include at least one vertical position sensor 119 that acquires altitude information for the navigation system 101. Additionally, the navigation system 101 may include one or more other sensors 117, which may provide additional sensor data to the processing unit 105. Examples of other sensors 117 may include electro-optical sensors, magnetometers, and/or other types of sensors.

During operation, the GNSS receiver 113 may receive GNSS satellite signals from GNSS satellites. As used herein, the GNSS satellites may be any combination of global positioning system (GPS) satellites, GLONASS satellites, Galileo system satellites, COMPASS (BeiDou) satellites, or other satellites that form part of a GNSS. The GNSS satellites may provide location information anywhere on the Earth where there is an unobstructed line of sight to four or more GNSS satellites. The processing unit 105 and GNSS receiver 113 may receive the satellite signals and extract position and time data from the signals to acquire pseudo-range measurements. Using multiple pseudo-range measurements, the processing unit 105 may compute a position, velocity, and time (PVT) solution. Additionally, the processing unit 105 may also use the pseudo-range measurements to detect satellite transmitter faults and to determine a worst-case error (a protection level) for the different aspects of the PVT solution. The processing unit 105 may provide the PVT solution to the management system 111. Additionally, the processing unit 105 may provide information to the management system 111, which then calculates the protection level and PVT solution along with indications of any detected faults. In certain embodiments, the management system 111 is a separate computational device that communicates with and manages the navigation computer 103. Alternatively, while not shown, the management system 111 may include the navigation computer 103. As used herein, the management system 111 may be a system that controls one or more subsystems associated with the object that corresponds to the navigation system 101.

The processing unit 105 and/or other computational devices used in the navigation system 101, management system 111, or other systems and methods described herein may be implemented using software, firmware, hardware, or appropriate combination thereof. The processing unit 105 and other computational devices may be supplemented by, or incorporated in, specially-designed application-specific integrated circuits (ASICs) or field programmable gate arrays (FPGAs). In some implementations, the processing unit 105 and/or other computational devices may communicate through an additional transceiver with other computing devices outside of the navigation system 101, such as those associated with the management system 111 or computing devices associated with other subsystems controlled by the management system 111. The processing unit 105 and other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor, such as the processing unit 105. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device. For instance, the memory unit 107 may be an example of a computer readable medium capable of storing computer readable instructions and/or data structures.

Suitable computer readable storage media (such as the memory unit 107) may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

As illustrated, the navigation computer 103 may receive measurements from a vertical position sensor 119. As used herein, the vertical position sensor 119 may refer to a sensing device that acquires the vertical distance of an object from another surface over which the object is positioned. For example, when the object associated with the navigation system 101 is an aircraft, the vertical position sensor 119 may be an altimeter that acquires the altitude of the aircraft with regards to the surface of the earth. For example, when the vertical position sensor 119 is an altimeter, the altimeter may be a pressure altimeter, a sonic altimeter, a radar altimeter, a laser altimeter, and the like. Alternatively, the vertical position sensor 119 may acquire the vertical position of other objects with regards to other surfaces.

As stated above, the vertical position sensor 119 may be a radar altimeter. As used herein, a radar altimeter may be an altimeter that measures the time taken for a radio signal to reflect from a surface back to the navigation system 101. Alternatively, a radar altimeter may be a frequency modulated continuous-wave radar altimeter, where the magnitude of the frequency shift in the reflected signal is proportional with a larger altitude or greater distance traveled by the emitted radio signal.

In some embodiments, the navigation computer 103 may use information stored in a terrain database 109 on the memory unit 107 in conjunction with the information acquired from the vertical position sensor 119. As used herein, the terrain database 109 may store information describing a surface over which an object or vehicle travels. For example, the terrain database 109 may store information describing locations on the earth surface along with an accompanying elevation. In some exemplary implementations, the terrain database 109 may store the latitude and longitude of locations throughout a region and for the described locations, the terrain database 109 may store an associated elevation. Alternatively, the terrain database 109 may cells to model a surface of a region where each cell is associated with an area of the surface and the terrain database 109 stores an elevation for each cell.

In further embodiments, the navigation computer 103 may use the computed position of the PVT solution, information acquired from the vertical position sensor 119, and the information stored in the terrain database 109 to aid in navigation of the object associated with the navigation system 101. The navigation computer 103 may use the PVT solution to identify a location described within the terrain database 109. Using the identified location, the navigation computer 103 may identify the elevation of the surface over which an object travels as stored in the terrain database 109. For example, when the navigating object is an aircraft, the navigation computer 103 may use the terrain database 109 to identify the elevation of the terrain over which the aircraft is flying. Using the elevation information acquired from the terrain database 109 and the distance above the surface acquired from the vertical position sensor 119, the navigation computer 103 may determine a reference frame altitude of the traveling object with respect to the surface.

However, as described above, calculating the reference frame altitude using the terrain database 109 and the computed horizontal position in the PVT solution may cause horizontal errors to become connected to vertical errors. In particular, when a horizontal error arises in the PVT solution, the navigation computer 103 may identify a point, or cell described in the terrain database 109 that is associated with the PVT solution. As the PVT solution fails to accurately describe the horizontal position of the object, the navigation computer 103 may select information in the terrain database 109 that is not associated with the true position of the object. Accordingly, the elevation acquired from the terrain database 109 may be inaccurate, such that when combined with the above surface information from the vertical position sensor 119, the resultant altitude may not accurately reflect the actual altitude of the object. Thus, the resultant altitude error may be caused by a horizontal error in the PVT solution.

To account for errors that may exist in the measurements, the navigation computer 103 may monitor the integrity of the various measurements used while navigating. For example, the processing unit 105 may receive GNSS signals from the GNSS receiver 113 and monitor the integrity of the received signals. As used herein, integrity is a measure of the level of trust that can be placed in the correctness of the information supplied for use by a navigation system 101. A system that performs integrity monitoring may monitor the integrity of the various measurements during the operation of the navigation system 101. To perform integrity monitoring, systems may implement integrity monitoring algorithms.

In certain embodiments, integrity monitoring algorithms are based on a solution separation methodology. In a solution separation methodology, a system determines a full solution and one or more subsolutions, where the full solution is calculated based on information acquired from a set of information sources and the subsolutions are calculated based on information acquired from subsets of the set of information sources. Using the full solution and the subsolutions, a system may determine the integrity of the full solution.

In some implementations, the solution separation methodology may be used to determine the integrity of PVT solutions calculated using information acquired from navigation satellites. For example, the main position solution may incorporate a set of pseudoranges from available satellites that are integrated with inertial sensor measurements, where the subsolutions are based on a subset of the pseudoranges from the available satellites. The system may then determine the protection limits for the main position solution based on differences or separations between the main position solution and the subsolutions.

In monitoring the integrity of the received GNSS signals, the navigation computer 103 may calculate various protection levels for the PVT solution for the object. As used herein, a protection level may refer to a statistical bound to the navigational measurements that are calculated using the information from the GNSS satellites. The protection level may define the distance between the edge of a region and the true position of a vehicle that is assured to contain the indicated position of the vehicle with a certain defined probability. Accordingly, the protection level may define a region where the missed alert and false alert requirements are met. Further, the protection level is not affected by actual measurements and the value of the protection level is predictable given reasonable assumptions regarding the expected error characteristics.

In certain embodiments, when calculating the various protection levels, the navigation computer 103 may calculate a horizontal protection level for the horizontal position of the object. As used herein, the horizontal position of an object may refer to a location on the surface of the terrain over which the object is positioned. Accordingly, the horizontal protection level may define a horizontal area around an estimated position of the object. Within a reasonable level of certainty, the actual position of the object is within the defined horizontal area.

In further embodiments, when the horizontal protection level is calculated for the position of the object, the navigation computer 103 may use information from the vertical position sensor 119 and the terrain database 109 to determine a new protection level for the vertical position. This vertical position protection level may be a range of vertical position measurements in relation to the terrain where the actual vertical position of the object in relation to the terrain is within a reasonable level of certainty. For example, the navigation computer 103 may identify the data within the terrain database 109 that is associated with the horizontal positions within the horizontal area defined by the horizontal protection level. The navigation computer 103 may then use the measurements provided by the vertical position sensor 119 and the identified data from the terrain database 109 to calculate the vertical position protection level.

When the vertical position sensor 119 is a radar altimeter, the vertical position sensor 119 may have a sensor field of view that includes a solid angle of illumination of the terrain below the object. The height measurement obtained from the vertical position sensor 119 may be in relation to an obstacle or elevation anywhere within the area illuminated by the beam emitted by the vertical position sensor 119. Accordingly, the identified data from the terrain database 109 may be associated with any of the locations illuminated by the beam emitted by the vertical position sensor 119. Thus, the area associated with the identified data from the terrain database 109 may be larger than the area defined by the horizontal protection level to include the area illuminated by the beam emitted by the vertical position sensor 119 from the horizontal positions associated with the horizontal protection level. Using the terrain data associated with this augmented area and the measurements from the vertical position sensor 119, the navigation computer 103 may calculate a vertical position protection level for the object.

Figure 2A:
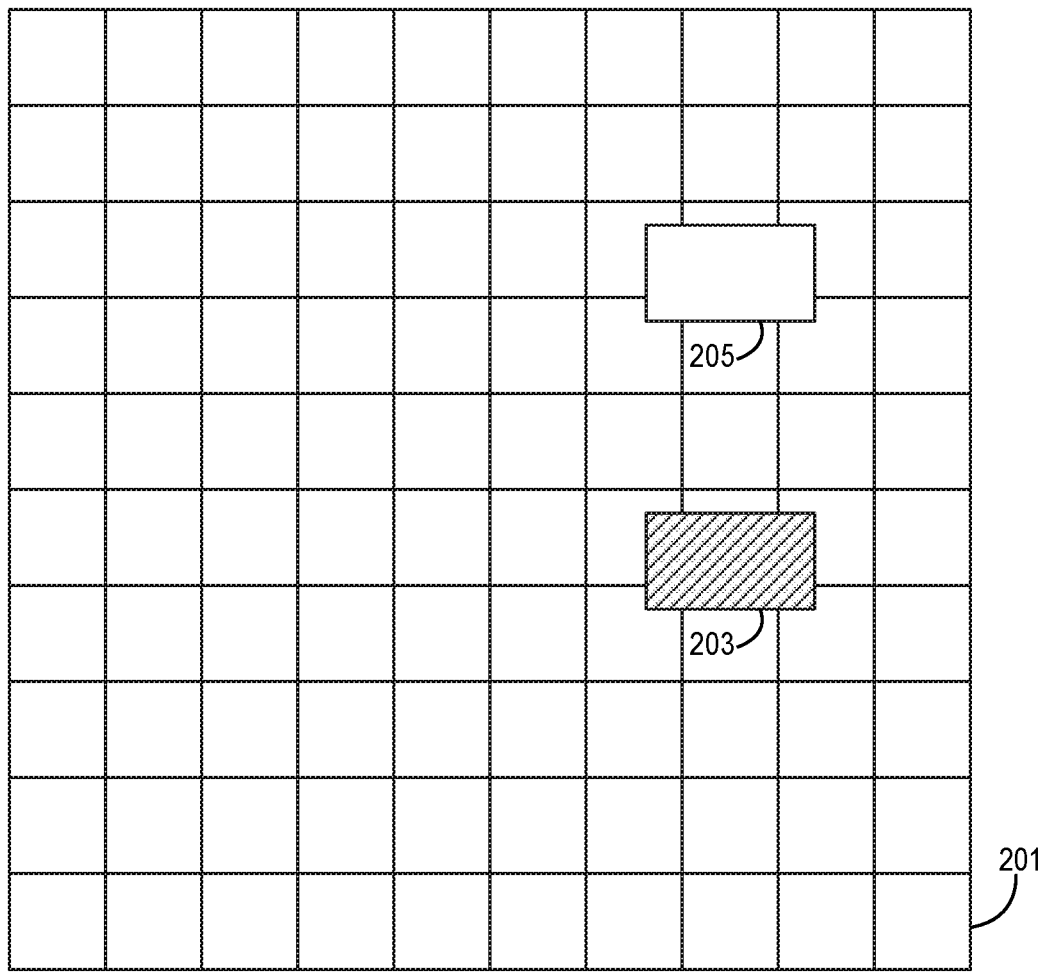
FIGS. 2A-2C are a series of diagrams illustrating the augmentation of a horizontal protection level bound area based on the radius of an area illuminated by a radar beam according to an aspect of the present disclosure.
Figure 2B:
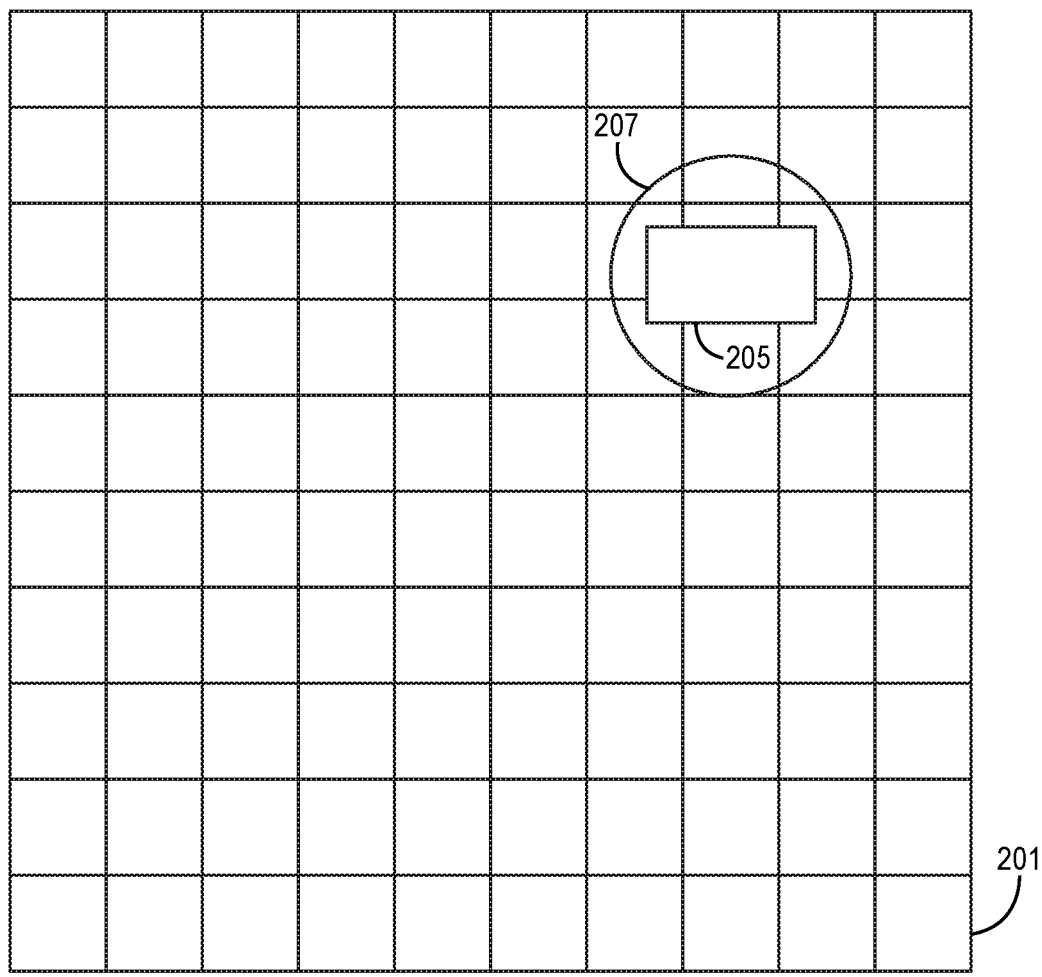
Figure 2C:
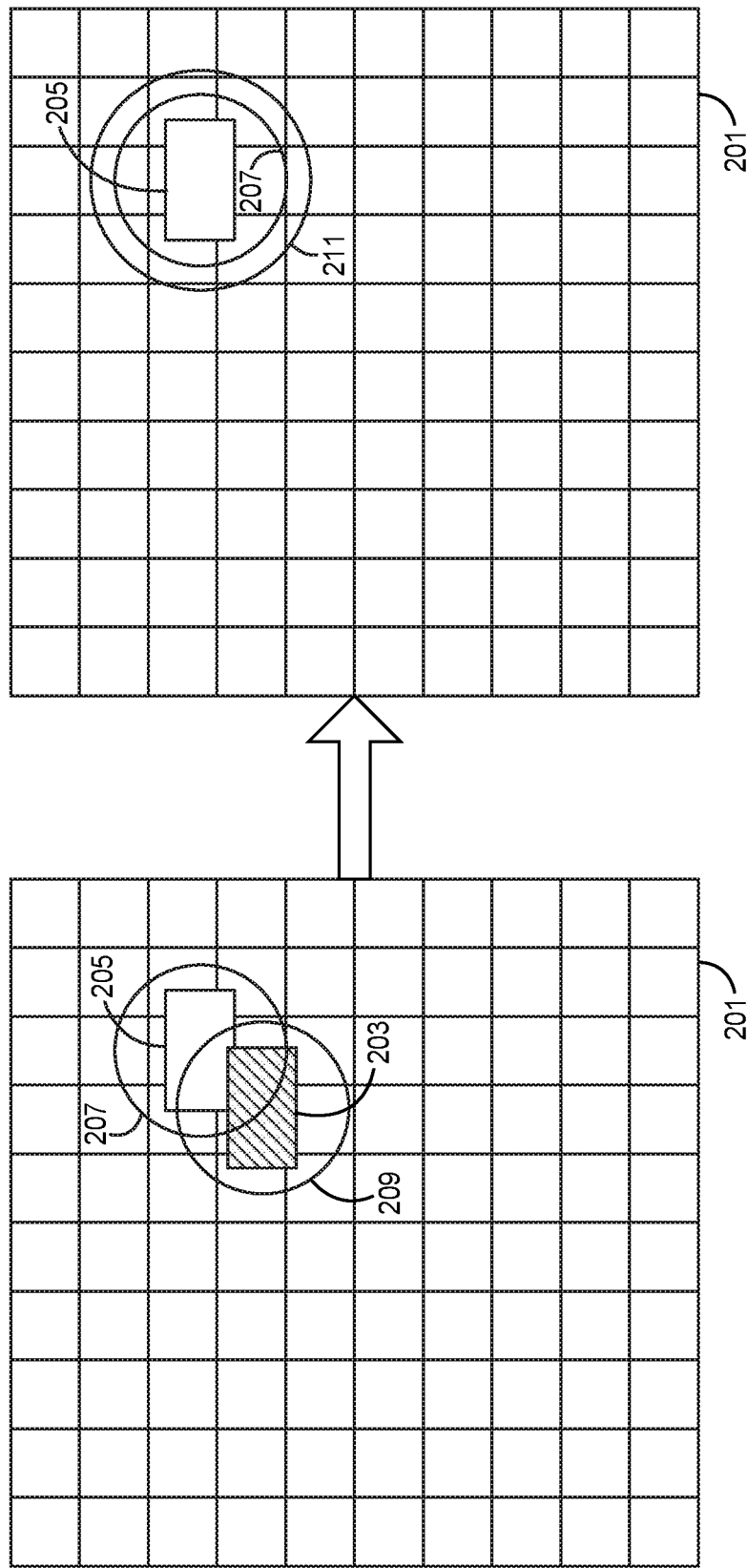

FIGS. 2A-2C provide diagrams of information representing the position of an object associated with cells in a terrain database 109 and the identification of measurements to be used in the handling of ARAIM induced terrain databased errors. As shown in FIG. 2A, the navigation computer 103 may use measurements acquired from GNSS satellites through the GNSS receiver 113 and other sensors to estimate the position 205 of the object. Using the estimated position 205 of the object, the navigation computer 103 may acquire terrain information 201 stored in the terrain database 109 that is associated with the estimated position 205 of the object. For example, the estimated position 205 of the object may be associated with one or more cells described by the terrain information 201. However, due to errors that may arise in the measurements acquired by the navigation computer, the estimated position 205 may not represent the actual position 203 of the object. Thus, the terrain information 201 associated with the estimated position 205 of the object may not accurately represent the actual terrain associated with the actual position 203 of the object.

FIG. 2B illustrates a protection level area 207 associated with a horizontal protection level for the estimated position 205 for the object. As described above, the navigation computer 103 may calculate the horizontal protection level for the estimated position 205 of the object. Accordingly, the horizontal protection level may define a protection level area 207 around the estimated position 205 of the object, where the actual position 203 is, within a reasonable level of certainty, within the protection level area 207.

FIG. 2C illustrates the identification of a terrain area 211, where the terrain area 211 identifies the terrain information that is potentially associated with the actual position 203 of the object. For example, the actual position 203 of the object is reasonably within the protection level area 207. Additionally, the object may include an illumination area 209 that represents the area that is illuminated by the vertical position sensor 119 as described above. As the actual position 203 may reasonably be located near the edge of the protection level area, the object may illuminate terrain having a horizontal position that is outside the protection level area 207. The aggregate of the potential areas illuminated by the object may form an augmented horizontal protection level area 211. The augmented horizontal protection level area 211 may be associated with terrain information that is potentially associated with the actual position 203 of the object. The terrain information associated with the augmented horizontal protection level area 211 may be used to account for the terrain databased induced errors.

In some embodiments, the navigation computer 103 may use the identified terrain data associated with the augmented horizontal protection level area 211 and the measurements from the vertical position sensor 119 to calculate the vertical position protection level for the object by accounting for the terrain database induced error on ARAIM protection levels. For example, the navigation computer 103 may compare the difference between the height of a tile to be used given the PVT solution and the height of the tiles within the boundary of the augmented horizontal protection level area 211. From this set of height differences (terrain database induced errors), the navigation computer 103 may compute a standard deviation and incorporate the computed standard deviation onto a vertical aiding sigma that may be used to compute the vertical protection level.

In certain embodiments, to calculate the standard deviation of the error set, the navigation computer 103 may assume that the probability of an error within the augmented horizontal protection level area is uniformly distributed. Accordingly, each difference from the measured terrain database cells and the terrain database cells within the augmented horizontal protection level area 211 may be treated as a sample, and navigation computer 103 may calculate the standard deviation of the terrain database height differences due to horizontal error directly from the samples.

Figure 3:
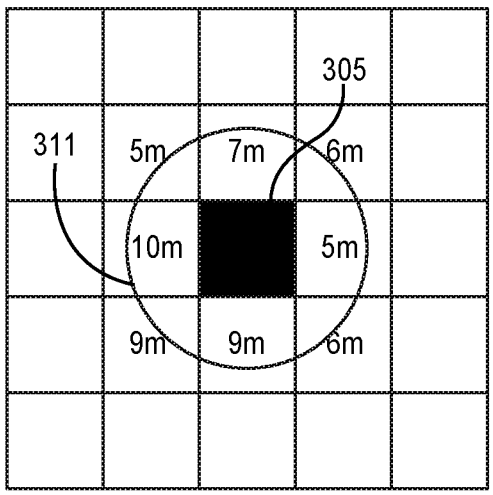
FIG. 3 is a series of diagrams illustrating the uniform sampling of errors associated with a horizontal protection level bound area according to an aspect of the present disclosure.
Figure 3:
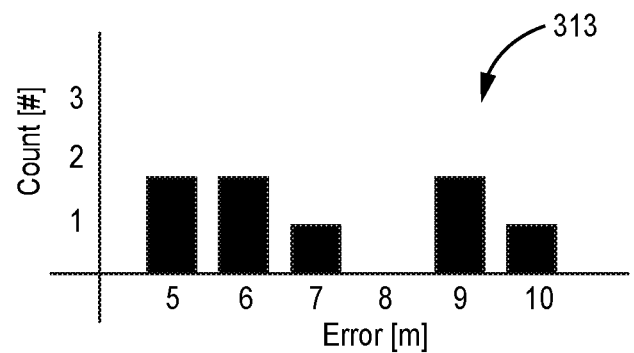

FIG. 3 is a graph 313 illustrating different errors within an augmented horizontal protection level area 311, where each error is treated as a sample. Accordingly, the errors for the different cells within the augmented horizontal protection level area 311 with respect to the cell associated with the estimated position 305 of the object, may be counted as a single sample within the graph 313.

Returning to FIG. 1, in alternative embodiments, to calculate the standard deviation of the error set, the navigation computer 103 may use the horizontal distribution of the cells within the terrain to build a bivariate Gaussian distribution. Accordingly, the distribution of the samples may account for the probability of a terrain database height difference given that the probability that an object is within a cell based on the estimated position of the object.

In some embodiments, to account for the probability of a terrain database height difference for a given cell, the navigation computer 103 may modify the probability mass of the different terrain database height differences due to horizontal error. In particular, the navigation computer 103 may compute a weighted histogram of the terrain database height differences ($\mathcal{H}_{TDB}$), where the weight of each sample would be related to the probability of the object having an estimated horizontal position associated with a particular terrain database height difference. A standard deviation overbound could then be computed from the data in the weighted histogram, where the overbound provides a model of the error where the computed probabilities and error are always greater than or equal to the true probability of error. For example, the standard deviation of the terrain database height differences may be calculated using the following equation:

$$\sigma_{TDB,uncertainty}^2 = \text{Overbound}(\mathcal{H}_{TDB}).$$

Using the standard deviation, the variance may be calculated as follows:

$$\sigma_{VA}^{New} = \sqrt{\sigma_{VerticalPosSensor}^2 + \sigma_{TDB,accuracy}^2 + \sigma_{TDB,uncertainty}^2},$$

where the vertical position sensor 119 is a radar altimeter.

FIG. 4 is a graph 413 illustrating different errors within an augmented horizontal protection level area 411, where the different errors are weighted based on the probability that the actual position of an object is associated with a particular terrain database height difference. For example, the object may have a greater probability of having an actual position in adjacent cells to the cell associated with the estimated position 405 when compared to cells that are not adjacent to the cell associated with the estimated position 405. Accordingly, height differences of the adjacent cells may have a greater weight than non-adjacent cells. As shown in the graph 413, adjacent cells are given a count of four and non-adjacent cells are given a count of one. Using the data in the graph 413, the navigation computer 103 may calculate the standard deviation as described above.

The methods above for calculating the standard deviation of the terrain database height differences are special implementations of the following general method. The distribution h of the elevation difference z (the difference from the assumed elevation $z_o$) that is induced by the distribution f of the lateral position may be expressed as:

$$h(z) = \int_{g^{-1}(z+z_0)} \frac{f}{\|\nabla g\|} dl + \sum_{i \in I} m_i \delta(z + z_0 - z_i),$$

where, in the first term, g is the function describing the terrain elevation, $g^{-1}(z+z_0)$ is the pre-image of the elevation $z+z_0$, i.e. a contour of g, and dl is the line element of the contour. In the second term, there is a weighted sum of Dirac delta functions, where weights are given by:

$$m_i = \int\int_{\Omega_i} f \, dxdy,$$

where $\Omega_i$ is the subset of the domain of g, where g has constant value $z_i$, and I is the index set. Then the variance of h is given by:

$$\int_{-\infty}^{+\infty} z^2 h(z) dz$$

In certain embodiments, the navigation computer 103 may execute a protection level algorithm to calculate a protection level for a particular dimension (dim) associated with the PVT solution of the object. For example, the navigation computer 103 may calculate an upper limit for the PL ($PL_{dim}^{upper}$) as follows:

$$PL_{dim}^{upper} \leftarrow \max_{1 \leq k \leq N_{faultModes}} \{Q^{-1}(P_{HMI,dim}/2)\sigma_{dim}^0 + b_{dim}^0 Q^{-1}(P_{HMI,dim}/P_{fault,k})\sigma_{dim}^k + b_{dim}^k + T_{dim}^k\}$$

where $N_{faultModes}$ represents the number of fault modes or subsolutions, $P_{HMI,dim}$ represents the probability of hazardous misleading information, $\sigma_{dim}^0$ represents the variance of the full solution and $b_{dim}^0$ represents the bias for the full solution. Additionally, $P_{fault,k}$ represents the probability of a fault for the subsolution, represents the variance of the subsolution, $b_{dim}^k$ represents the bias for the subsolution, and $T_{dim}^k$ represents a threshold for the subsolution. Additionally, the navigation computer 103 may calculate a lower limit for the protection level as follows:

$$PL_{dim}^{lower} \leftarrow \max_{1 \leq k \leq N_{faultModes}} \{Q^{-1}(P_{HMI,dim}/2(N_{faultModes}-1))\sigma_{dim}^0 + b_{dim}^0 Q^{-1}(P_{HMI,dim}/P_{fault,k}(N_{faultModes}-1))\sigma_{dim}^k + b_{dim}^k + T_{dim}^k\}.$$

In certain embodiments, when the navigation computer 103 has calculated the above upper and lower protection levels for the particular dimension, the navigation computer 103 may perform the following iterations while the magnitude of the difference between the upper and lower protection levels are greater than a threshold $T_p$:

while($|PL_{dim}^{upper} - PL_{dim}^{lower}| > T_p$):
  a.
$$PL_{dim}^{mid} \leftarrow \frac{(PL_{dim}^{upper} + PL_{dim}^{lower})}{2}$$

b.
$$P_{mid} \leftarrow 2Q\left(\frac{PL_{dim}^{mid} - b_{dim}^0}{\sigma_{dim}^0}\right)$$

c. for all $1 \leq k \leq N_{faultModes}$:
    i.
$$P_{mid} \leftarrow P_{mid} + P_{fault,k} Q\left(\frac{PL_{dim}^{mid} - T_{dim}^k - b_{dim}^k}{\sigma_{dim}^k}\right)$$

d. if $P_{mid} > P_{HMI,dim}$:
    i. $PL_{dim}^{upper} \leftarrow P_{mid}$
  e. else:
    i. $PL_{dim}^{lower} \leftarrow P_{mid}$
output $PL_{dim}^{lower}$ The output $PL_{dim}^{lower}$ may then be used as the calculated protection level for the particular dimension. Using the above described algorithm, the navigation computer 103 may calculate a protection level for a dimension.

In certain embodiments, the above protection level algorithm may be modified to calculate the horizontal protection limit and the vertical protection limit accounting for the terrain induced database errors. For example, the navigation computer 103 may use multiple inputs based on the measurements available to the navigation computer 103 that are related to the horizontal and vertical position of the object. For example, in addition to the variables described above, the multiple inputs may include an easting probability of hazardous misleading information $P_{HMI,east}$, a northing probability of hazardous misleading information $P_{HMI,north}$, and a vertical probability of hazardous misleading information $P_{HMI,up}$. Additionally, the inputs may include an easting subsolution variance $\sigma_{east}^k$, a northing subsolution variance $\sigma_{north}^k$, and a vertical subsolution variance $\sigma_{up}^k$. Further, the inputs may include an easting subsolution bias $b_{east}^k$, a northing subsolution bias $b_{north}^k$, and a vertical subsolution bias $b_{up}^k$. Also, the inputs may include an easting subsolution threshold $T_{east}^k$, a northing subsolution threshold $T_{north}^k$, and a vertical subsolution threshold $T_{up}^k$.

Using the above described inputs, the navigation computer 103 may perform the following modified protection level algorithm:

1. for $\forall$ dim $\in$ {east north} a. $PL_{dim}^{upper} \leftarrow \max_{1 \leq k \leq N_{faultModes}} \{Q^{-1}(P_{HMI,dim}/2)\sigma_{dim}^0 + b_{dim}^0 Q^{-1}(P_{HMI,dim}/P_{fault,k})\sigma_{dim}^k + b_{dim}^k + T_{dim}^k\}$ b. $PL_{dim}^{lower} \leftarrow \max_{1 \leq k \leq N_{faultModes}} \{Q^{-1}(P_{HMI,dim}/2(N_{faultModes}-1))\sigma_{dim}^0 + b_{dim}^0 Q^{-1}(P_{HMI,dim}/P_{fault,k}(N_{faultModes}-1))\sigma_{dim}^k + b_{dim}^k + T_{dim}^k\}$ 2. Update protection level estimates
3. while (($|PL_{East}^{upper} - PL_{East}^{lower}| > T_p$) & ($|PL_{North}^{upper} - PL_{North}^{lower}| > T_p$)):
  a. for $\forall$ dim $\in$ {east north}
    i. if $|PL_{dim}^{upper} - PL_{dim}^{lower}| > T_p$
      1.
$$PL_{dim}^{mid} \leftarrow \frac{(PL_{dim}^{upper} + PL_{dim}^{lower})}{2}$$

2.
$$P_{mid} \leftarrow 2Q\left(\frac{PL_{dim}^{mid} - b_{dim}^0}{\sigma_{dim}^0}\right)$$

3. for all $1 \leq k \leq N_{faultModes}$:

-continued a.
$$P_{mid} \leftarrow P_{mid} + P_{fault,k} Q\left(\frac{PL_{dim}^{mid} - T_{dim}^k - b_{dim}^k}{\sigma_{dim}^k}\right)$$

4. if $P_{mid} > P_{HMI,dim}$:
   a. $PL_{dim}^{upper} \leftarrow P_{mid}$
5. else:
   b. $PL_{dim}^{lower} \leftarrow P_{mid}$
6. Update protection level estimates When the magnitude of the difference between the upper easting protection level and the lower easting protection level and the magnitude of the difference between the upper northing protection level and the lower northing protection level are less than the threshold, the navigation computer 103 may use the output horizontal protection level from the above modified protection level algorithm and the above described protection level algorithm to calculate a vertical protection level for the vertical position of the object.

As part of the modified protection level algorithm, the navigation computer 103 may execute a protection level estimate update algorithm that calculates updates for the horizontal protection level. In some embodiments, the protection level estimate update algorithm may use the easting protection level $PL_{East}^{type}$, northing protection level $PL_{North}^{type}$, along with information describing possible terrain database induced errors $TDB_{data}$. With these inputs, the navigation computer 103 may perform the following update algorithm:

1. $HPL_{estimate}^{type} = \sqrt{(PL_{East}^{type})^2 + (PL_{North}^{type})^2}$
2. Use $TDB_{data}$ and $HPL_{estimate}^{type}$ to find set of possible TDB induced errors
3. From the set of possible TDB induced errors compute a new $\sigma_{East}$ and $\sigma_{North}$:
   a. $\sigma_{TDB} = f(HPL_{estimate}^{type}, TDB_{data})$
   b. $\sigma_{VA}^{New} = \sqrt{\sigma_{VA}^2 + \sigma_{TDB}^2}$
   c. $S^{New} = f(\sigma_{VA}^{New}, etc \ldots)$
   d. $\sigma_{East} = S^{New}(1,1)$
   e. $\sigma_{North} = S^{New}(2,2)$
4. Using newly calculated sigmas, compute new protection level estimates
a. If upper:

$$PL_{dim}^{upper} \leftarrow \max_{1 \leq k \leq N_{faultModes}} \{Q^{-1}(P_{HMI,dim}/2)\sigma_{dim}^0 + b_{dim}^0, Q^{-1}(P_{HM1,dim}/P_{fault,k})\sigma_{dim}^k + b_{dim}^k + T_{dim}^k\}$$

b. If lower:

$$PL_{dim}^{lower} \leftarrow \max_{1 \leq k \leq N_{faultModes}} \{Q^{-1}(P_{HM1,dim}/2(N_{faultModes}-1))\sigma_{dim}^0 + b_{dim}^0, Q^{-1}(P_{HM1,dim}/P_{fault,k}(N_{faultModes}-1))\sigma_{dim}^k + b_{dim}^k + T_{dim}^k\}$$

Accordingly, using the above described algorithms, the navigation computer 103 may account for the induced terrain database errors.

In alternative embodiments, the navigation computer 103 may use the identified terrain data and the measurements from the vertical position sensor 119 to calculate the vertical position protection level for the object by accounting for the terrain database induced error on ARAIM as a bias. For example, the navigation computer 103 may compute the set of possible vertical errors due to the usage of a wrong terrain database point/tile on the conversion of height above ground to a reference frame altitude and find the maximum of such an error. The possible vertical errors may then be computed by comparing the difference between the height of the tile to be used given the PVT solution of the object in the height of the tiles within the horizontal protection level bounds. From the set of possible vertical errors, the navigation computer 103 may identify the maximum error of the set as the vertical aiding bias input to the ARAIM vertical protection level computation.

In additional embodiments, the navigation computer 103 may use the identified terrain data and the measurements from the vertical position sensor 119 to account for the terrain database induced error outside of ARAIM calculations. For example, the navigation computer 103 may calculate the set of possible vertical errors due to the usage of the terrain database point/tile on the conversion of height above ground to a reference frame altitude and find the maximum of such an error. The navigation computer 103 may calculate these possible errors by comparing the difference between the height of the tile to be used given the PVT solution of the object in the height of the tiles within the HPL bound. The navigation computer 103 may then designate the maximum error in the set of calculated errors as the protection level for the terrain database.

In further embodiments, the navigation computer 103 may calculate an alert limit for the terrain database induced errors. For example, the navigation computer 103 may identify the maximum vertical error induced by the horizontal error, via the terrain database, that is acceptable from the system integrity perspective and designate the identified error as a terrain database alert limit. The navigation computer 103 may use the calculated protection level for the terrain database, calculated using any of the methods described above, and the identified terrain database alert limit in parallel with other protection limits and alert limits used with the ARAIM.

FIG. 5 is a flowchart diagram illustrating a method 500 for handling Advanced Receiver Autonomous Integrity Monitor (ARAIM) terrain database induced errors according to an aspect of the present disclosure. The method 500 proceeds at 501, where position information is computed. For example, the position information may be computed by a navigation computer 103 using information from a global navigation satellite system. When the position information is computed, the method 500 may proceed at 503, where an altitude is computed. For example, a navigation computer 103 may compute the altitude based on retrieved information from a vertical position sensor 119 and a terrain database 109.

In certain embodiments, when the altitude is computed, the method 500 may proceed at 505, where a horizontal protection level is computed. In some implementations, the calculated horizontal protection level may be associated with the previously calculated position information. Additionally, the method 500 may proceed at 507 where an error for a terrain database is estimated. For example, the navigation computer 103 may estimate the error for the terrain database based on the altitude, position information, and a horizontal protection level. Moreover, the method 500 may proceed at 509, where a new protection level is calculated. In some implementations, the navigation computer 103 may calculate a vertical protection level based on the position information and the altitude while accounting for the estimated error for the terrain database.

Example Embodiments

Example 1 includes a method comprising: computing position information from a global navigation satellite system; computing altitude based on retrieved information from a vertical position sensor and a terrain database; computing a horizontal protection level associated with the position information; estimating an error for a terrain database based on the altitude, position information, and the horizontal protection level; and calculating a new protection level based on the position information and the altitude accounting for the estimated error for the terrain database.

Example 2 includes the method of Example 1, wherein calculating a new protection level comprises: computing a standard deviation for the estimated error; and calculating the new protection level using the standard deviation.

Example 3 includes the method of Example 2, wherein computing the standard deviation comprises: estimating a plurality of position errors for different positions represented in the terrain database in relation to the position information; and computing the standard deviation using each position error in the plurality of position errors as a sample having equal probability of occurring.

Example 4 includes the method of any of Examples 2-3, wherein computing the standard deviation comprises: estimating a plurality of position errors for different positions represented in the terrain database in relation to the position information; and computing the standard deviation using the plurality of position errors, wherein each position error in the plurality of position errors is weighted based on a probability of occurring.

Example 5 includes the method of any of Examples 1-4, wherein calculating a new protection level comprises: identifying differences between heights of points within the terrain database that are associated with the horizontal protection level and a height associated with the position information; setting a vertical bias to a largest difference in the identified differences; and calculating a vertical protection level using the vertical bias.

Example 6 includes the method of any of Examples 1-5, wherein calculating a new protection level comprises: identifying differences between heights of points within the terrain database that are associated with the horizontal protection level and a height associated with the position information; and setting a vertical protection level to a largest difference in the identified differences.

Example 7 includes the method of any of Examples 1-6, further comprising: identifying differences between heights of points within the terrain database that are associated with the horizontal protection level and a height associated with the position information; determining whether a largest difference in the identified differences is acceptable by comparing the largest difference against a largest acceptable difference; and when the largest difference is acceptable, setting the largest difference as an alert limit.

Example 8 includes the method of any of Examples 1-7, wherein the vertical position sensor comprises at least one of: a radar altimeter; a pressure altimeter; a sonic altimeter; and a laser altimeter.

Example 9 includes the method of any of Examples 1-8, further comprising augmenting an area associated with the horizontal protection level with areas within a field of view for the vertical position sensor at a plurality of positions within the area.

Example 10 includes a system comprising: a receiver configured to receive a plurality of signals transmitted from a plurality of transmitters; a vertical position sensor configured to provide information associated with a vertical position of an object in relation to terrain; a memory unit that stores a terrain database; and a processing unit operatively coupled to the receiver, the vertical position sensor, and the memory unit, the processing unit configured to: compute horizontal position information from the plurality of signals; compute altitude based on the information associated with a vertical position and information from the terrain database; compute the horizontal protection level associated with the computed horizontal position; estimate an error for a terrain database based on the computed horizontal position, the horizontal protection level, and the altitude; and calculate a new protection level based on the horizontal position information and the altitude accounting for the estimated error for the terrain database.

Example 11 includes the system of Example 10, wherein the processing unit calculates a new protection level by: computing a standard deviation for the estimated error; and calculating the new protection level using the standard deviation.

Example 12 includes the system of Example 11, wherein the processing unit computes the standard deviation by: estimating a plurality of position errors for different positions represented in the terrain database in relation to the horizontal position information; and computing the standard deviation using each position error in the plurality of position errors as a sample having equal probability of occurring.

Example 13 includes the system of any of Examples 11-12, the processing unit computes the standard deviation by: estimating a plurality of position errors for different positions represented in the terrain database in relation to the horizontal position information; and computing the standard deviation using the plurality of position errors, wherein each position error in the plurality of position errors is weighted based on a probability of occurring.

Example 14 includes the system of any of Examples 10-13, wherein the processing unit calculates a new protection level by: identifying differences between heights of points within the terrain database that are associated with the horizontal protection level and a height associated with the horizontal position information; setting a vertical bias to a largest difference in the identified differences; and calculating a vertical protection level using the vertical bias.

Example 15 includes the system of any of Examples 10-14, wherein the processing unit calculates a new protection level by: identifying differences between heights of points within the terrain database that are associated with the horizontal protection level and a height associated with the horizontal position information; and setting a vertical protection level to a largest difference in the identified differences.

Example 16 includes the system of any of Examples 10-15, wherein the processing unit is further configured to: identify differences between heights of points within the terrain database that are associated with the horizontal protection level and a height associated with the horizontal position information; determine whether a largest difference in the identified differences is acceptable by comparing the largest difference against a largest acceptable difference; and when the largest difference is acceptable, set the largest difference as an alert limit.

Example 17 includes the system of any of Examples 10-16, wherein the vertical position sensor is a radar altimeter.

Example 18 includes the system of any of Examples 10-17, wherein the processing unit is further configured to augment an area associated with the horizontal protection level with areas within a field of view for the vertical position sensor at a plurality of positions within the area.

Example 19 includes a method comprising: computing position information from a global navigation satellite system; computing altitude based on retrieved information from a vertical position sensor and a terrain database; computing the horizontal protection level associated with the position information; estimating an error for a terrain database based on the position information, the altitude, the horizontal protection level, and a sensor field of view; and calculating a new protection level, using solution separation methodology, based on the position information and the altitude accounting for the estimated error for the terrain database.

Example 20 includes the method of Example 19, wherein calculating a new protection level comprises: computing a standard deviation for the estimated error; and calculating the new protection level using the standard deviation.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
    computing position information from a global navigation satellite system;
    computing altitude based on retrieved information from a vertical position sensor and a terrain database;
    computing a horizontal protection level associated with the position information;
    estimating an error for a terrain database based on the altitude, position information, and the horizontal protection level; and
    calculating a new protection level based on the position information and the altitude accounting for the estimated error for the terrain database.

2. The method of claim 1, wherein calculating a new protection level comprises:
    computing a standard deviation for the estimated error; and
    calculating the new protection level using the standard deviation.

3. The method of claim 2, wherein computing the standard deviation comprises:
    estimating a plurality of position errors for different positions represented in the terrain database in relation to the position information; and
    computing the standard deviation using each position error in the plurality of position errors as a sample having equal probability of occurring.

4. The method of claim 2, wherein computing the standard deviation comprises:
    estimating a plurality of position errors for different positions represented in the terrain database in relation to the position information; and
    computing the standard deviation using the plurality of position errors, wherein each position error in the plurality of position errors is weighted based on a probability of occurring.

5. The method of claim 1, wherein calculating a new protection level comprises:
    identifying differences between heights of points within the terrain database that are associated with the horizontal protection level and a height associated with the position information;
    setting a vertical bias to a largest difference in the identified differences; and
    calculating a vertical protection level using the vertical bias.

6. The method of claim 1, wherein calculating a new protection level comprises:
    identifying differences between heights of points within the terrain database that are associated with the horizontal protection level and a height associated with the position information; and
    setting a vertical protection level to a largest difference in the identified differences.

7. The method of claim 1, further comprising:
    identifying differences between heights of points within the terrain database that are associated with the horizontal protection level and a height associated with the position information;
    determining whether a largest difference in the identified differences is acceptable by comparing the largest difference against a largest acceptable difference; and
    when the largest difference is acceptable, setting the largest difference as an alert limit.

8. The method of claim 1, wherein the vertical position sensor comprises at least one of:
    a radar altimeter;
    a pressure altimeter;
    a sonic altimeter; and
    a laser altimeter.

9. The method of claim 1, further comprising augmenting an area associated with the horizontal protection level with areas within a field of view for the vertical position sensor at a plurality of positions within the area.

10. A system comprising:
    a receiver configured to receive a plurality of signals transmitted from a plurality of transmitters;
    a vertical position sensor configured to provide information associated with a vertical position of an object in relation to terrain;
    a memory unit that stores a terrain database; and
    a processing unit operatively coupled to the receiver, the vertical position sensor, and the memory unit, the processing unit configured to:

compute horizontal position information from the plurality of signals;

compute altitude based on the information associated with a vertical position and information from the terrain database;

compute the horizontal protection level associated with the computed horizontal position;

estimate an error for a terrain database based on the computed horizontal position, the horizontal protection level, and the altitude; and calculate a new protection level based on the horizontal position information and the altitude accounting for the estimated error for the terrain database.

11. The system of claim 10, wherein the processing unit calculates a new protection level by:

computing a standard deviation for the estimated error; and calculating the new protection level using the standard deviation.

12. The system of claim 11, wherein the processing unit computes the standard deviation by:

estimating a plurality of position errors for different positions represented in the terrain database in relation to the horizontal position information; and computing the standard deviation using each position error in the plurality of position errors as a sample having equal probability of occurring.

13. The system of claim 11, the processing unit computes the standard deviation by:

estimating a plurality of position errors for different positions represented in the terrain database in relation to the horizontal position information; and computing the standard deviation using the plurality of position errors, wherein each position error in the plurality of position errors is weighted based on a probability of occurring.

14. The system of claim 10, wherein the processing unit calculates a new protection level by:

identifying differences between heights of points within the terrain database that are associated with the horizontal protection level and a height associated with the horizontal position information;

setting a vertical bias to a largest difference in the identified differences; and calculating a vertical protection level using the vertical bias.

15. The system of claim 10, wherein the processing unit calculates a new protection level by:

identifying differences between heights of points within the terrain database that are associated with the horizontal protection level and a height associated with the horizontal position information; and setting a vertical protection level to a largest difference in the identified differences.

16. The system of claim 10, wherein the processing unit is further configured to:

identify differences between heights of points within the terrain database that are associated with the horizontal protection level and a height associated with the horizontal position information;

determine whether a largest difference in the identified differences is acceptable by comparing the largest difference against a largest acceptable difference; and when the largest difference is acceptable, set the largest difference as an alert limit.

17. The system of claim 10, wherein the vertical position sensor is a radar altimeter.

18. The system of claim 10, wherein the processing unit is further configured to augment an area associated with the horizontal protection level with areas within a field of view for the vertical position sensor at a plurality of positions within the area.

19. A method comprising:

computing position information from a global navigation satellite system;

computing altitude based on retrieved information from a vertical position sensor and a terrain database;

computing the horizontal protection level associated with the position information;

estimating an error for a terrain database based on the position information, the altitude, the horizontal protection level, and a sensor field of view; and calculating a new protection level, using solution separation methodology, based on the position information and the altitude accounting for the estimated error for the terrain database.

20. The method of claim 19, wherein calculating a new protection level comprises:

computing a standard deviation for the estimated error; and calculating the new protection level using the standard deviation.

* * * * *